United States Patent [19]

Baccei

[11] 4,018,851

[45] Apr. 19, 1977

[54] CURABLE POLY(ALKYLENE) ETHER POLYOL-BASED GRAFTED RESINS HAVING IMPROVED PROPERTIES

[75] Inventor: Louis J. Baccei, Newington, Conn.

[73] Assignee: Loctite Corporation, Newington, Conn.

[22] Filed: Mar. 12, 1975

[21] Appl. No.: 557,564

[52] U.S. Cl. .................... 260/859 R; 260/859 PV
[51] Int. Cl.$^2$ ........................................... C08L 75/08
[58] Field of Search ............... 260/859 R, 859 PV; 204/159.15

[56] References Cited

UNITED STATES PATENTS

| | | | |
|---|---|---|---|
| 3,304,273 | 2/1967 | Stamberger | 260/2.5 |
| 3,509,234 | 4/1970 | Burlant | 260/859 R |
| 3,850,770 | 11/1974 | Juna | 260/859 R |
| 3,882,007 | 5/1975 | Watanabe | 260/859 R |
| 3,891,523 | 6/1975 | Hisamatsu | 260/859 R |
| 3,933,938 | 1/1976 | Rhodes | 260/859 R |

FOREIGN PATENTS OR APPLICATIONS

| | | | |
|---|---|---|---|
| 1,040,452 | 8/1966 | United Kingdom | 260/2.5 |

OTHER PUBLICATIONS

Frish, "Advances in Urethane Science and Technology", vol. 2, pp. 8, 9, 10, & 11, 1973.
Kuryta, "Polymer/Polyols, a New class of Polyurethane Intermediates", J. Cellular Plastics, Mar. 1966, pp.84-96.

*Primary Examiner*—Paul R. Michl
*Attorney, Agent, or Firm*—Jean B. Mauro

[57] ABSTRACT

A polymerizable composition, suitable for use as an adhesive, sealant or coating, comprising a urethane-acrylate-capped prepolymer based on a graft polyol derived from the reaction between the polyol and a vinyl monomer or polymer. In a preferred embodiment, the graft polyol is present as the disperse phase of a polymer/polyol dispersion. The composition provides improved general properties, particularly cure-through-gap and impact properties. The composition typically has a relatively low viscosity, making it especially useful for "retaining" purposes. A process for preparing the composition and a process for using it are also disclosed.

56 Claims, No Drawings

CURABLE POLY(ALKYLENE) ETHER POLYOL-BASED GRAFTED RESINS HAVING IMPROVED PROPERTIES

BACKGROUND OF THE INVENTION

1. Field of the Invention

This invention relates to certain poly(alkylene)ether polyol-based grafted resins, curable by free radical initiation, and having improved impact, and cure-through-volume properties as well as good over-all properties. More specifically, it relates to resins which may be viewed as a reaction product of grafted poly(alkylene)ether polyols with, e.g., methacrylate-capped aromatic diisocyanates.

2. Prior Art

It is known that curable anaerobic resins having desirable properties may be prepared as the reaction product of an organic polyisocyanate and an acrylate ester having an active hydrogen in the non-acrylate portion of the ester. Such resins are disclosed in U.S. Pat. No. 3,425,988 to Gorman et al. This patent relates specifically to monofunctional, acrylate-terminated material which is reacted with organic polyisocyanate in such proportions as to convert all of the isocyanate groups to urethane or ureide groups. The acrylate esters are preferably the acrylates and methacrylates containing hydroxy or amino functional groups on the non-acrylate portions thereof.

It is also known that poly(alkylene)ether glycols may be reacted with organic isocyanates to form urethane prepolymers which are subsequently cured by reaction with an active hydrogen molecule, e.g., with alcohols, amines, water, or other agents. Such systems are two-part systems, that is, the alcohol or amine must be kept separate from the prepolymer until the time of actual use since the mixed system has very limited pot life. As would be expected, the mixing of these viscous liquids leads to problems of nonhomogeniety and therefore imperfect cure, as well as causing substantial inconvenience. Similar urethane coatings curable through the action of moisture are also known, but have the defect that cure begins as soon as the coating is spread, thereby interfering with control of the coating operation and causing inconvenience.

SUMMARY OF THE INVENTION

Now, however, there is provided a polymerizable composition based on prepolymers which are derived from the reaction between vinyl grafted poly(alkylene)ether polyols and organic poly-isocyanates, preferably diisocyanates, which can be prepared as a one-part system having desirably low viscosity, excellent dispersion stability, long pot life and more controllable cure characteristics. The prepolymers of this invention are also characterized by being acrylate, e.g., methacrylate, terminated. These prepolymers are curable by free radical generating initiators, e.g., peroxy compounds or ultraviolet sensitive compounds. When formulated with hydroperoxides, they acquire anaerobic curing characteristics. The compositions of this invention have broad utility as adhesives, sealants and coatings and generally provide, among other benefits, improved physical properties such as excellent tensile and impact strengths, good flexibility even at low temperatures, and excellent ability to cure through quite large gaps, e.g., 20-30 mils or more.

Specifically, the present invention provides a curable composition comprising:

I. a polymerizable product corresponding in structure to a reaction product of:
  a. a poly(alkylene)ether polyol to which a vinyl radical has been grafted, with either of:
  b. (i) a molar excess of a reaction product of: a molar excess of an aromatic or cycloaliphatic polyisocyanate with a compound selected from the group consisting of an aromatic or cycloaliphatic polyol or polyamine, or (ii) a molar excess of an aromatic or cycloaliphatic polyisocyanate, the product of (a) and (b)(i) or (a) and (b)(ii) subsequently being reacted with a molar excess of a hydroxyalkyl acrylate, a hydroxyalkyl methacrylate, an aminoalkyl acrylate, or an aminoalkyl methacrylate; and II. A free radical initiator.

Reactant (a), above, may also comprise a polyol(alkylene) ether polyol in which is dispersed a reaction product derived by grafting a vinyl radical onto said polyol.

There is also provided a process for preparing the monomer of Part I, above, comprising reacting the grafted polyol or grafted polyol/polyol dispersion of Part I(a) with either of:

i. a molar excess of a reaction product of: a molar excess of an aromatic or cycloaliphatic polyisocyanate with a compound selected from the group consisting of an aromatic or cycloaliphatic polyol or polyamine, or
  ii. a molar excess of an aromatic or cylcoaliphatic polyisocyanate, the product subsequently being reacted with a molar excess of a hydroxyalkyl acrylate, a hydroxyalkyl methacrylate, an aminoalkyl acrylate, or an aminoalkyl methacrylate.

In addition, there is provided a process for sealing or adhering surfaces which comprises applying to at least one of said surfaces the above polymerizable compositions, then placing said surfaces in an abutting relationship until the composition has cured.

DETAILED DESCRIPTION OF THE INVENTION

The monomer of the present invention may be viewed as a one-component polymerizable block copolymer (prepolymer) having rigid and flexible segments. This is achieved by the chemical linking of two precursor "prepolymers" which are subsequently "capped" with acrylate, e.g., methacrylate, functionality. Accordingly, in a preferred embodiment, a "flexible" grafted polymeric propylene ether polyol segment of relatively low molecular weight is reacted with a molar excess of a "rigid" diisocyanate such as toluene diisocyanate or methylene diisocyanate (4,4'-diisocyanate diphenyl-methane), thereby forming urethane linkages. Before reacting with the grafted diol, the diisocyanate is preferably reacted in excess with another rigid moiety containing at least two active hydrogen atoms, such as in hydroxy or amine groups, thereby capping the other rigid moiety with —NCO groups. By the term "rigid" segment is meant a segment or segments containing aromatic, heterocyclic or cycloaliphatic rings. If multiple segments are involved, they should be joined by either fusing of the rings or by a minimum number of carbon atoms (e.g., 1-2 if linear, 1-about 8 if branched) or hetero atoms such that there is little or no flexing of the segments. By the term "flexible" segment is meant a segment comprising the grafted aliphatic ether moieties described herein. Pendant functional groups, including aromatic, heterocyclic and cycloaliphatic, among others, may be present in the polyvinyl moiety, and branching may also be incorporated in either the polyvinyl or polyol moiety, provided that there is no substantial interference with the necessary flexible nature of the segment nor degradation of the cured resin properties disclosed herein.

Illustrative of the polyisocyanates employed in the preparation of the new monomers are, among others, phenyl diisocyanate, toluene diisocyanate, 4,4'-diphenyl diisocyanate, 4,4'-diphenylene methane diisocyanate, dianisidine diisocyanate, 1,5-naphthalene diisocyanate, 4,4'-diphenyl ether diisocyanate, p-phenylene diisocyanate, 4,4'-dicyclo-hexylmethane diisocyanate, 1,3-bis-(isocyanatomethyl) cyclohexane, cyclohexylene diisocyanate, tetrachlorophenylene diisocyanate, 2,6-diethyl-p-phenylenediisocyanate, and 3,5-diethyl-4,4'-diisocyanatodiphenyl-methane. Still other polyisocyanates that may be used are the higher molecular weight rigid polyisocyanates obtained by reacting polyamines containing terminal, primary and secondary amine groups or polyhydric alcohols, for example, the alkane, cycloalkane, alkene and cycloalkene polyols such as glycerol, ethylene glycol, bisphenol-A, substituted bisphenol-A, and the like, with an excess of any of the above-described isocyanates. These higher molecular weight urethane or ureide polyisocyanates may be represented by the formula:

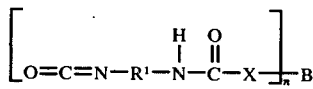

wherein $R^1$ is an organic radical selected from the group consisting of alkyl, alkenyl, cycloalkyl, cycloalkenyl, aryl, aralkyl, and alkaryl radicals of 2 to about 20 carbon atoms, both substituted and unsubstituted; X is —O— or

wherein $R^2$ is hydrogen or lower alkyl of 1 to 7 carbon atoms; B is a polyvalent organic radical selected from the group consisting of cycloalkyl, cycloalkenyl, aryl, aralkyl, alkaryl and heterocyclic radicals, both substituted and unsubstituted; and n is an integer from 2 to about 6.

As indicated above, the diisocyanate is preferably reacted with another rigid segment comprising an aromatic, heterocyclic or cycloaliphatic compound containing at least two active hydrogen atoms, preferably diamines and more preferably diols. Suitable compounds are 2,2-(4,4'-dihydroxydiphenyl)-propane (i.e., bisphenol-A), 4,4'-iso-propylidenedicyclohexanol (i.e., hydrogenated bisphenol-A), ethoxylated bisphenol-A, propoxylated bisphenol-A, 2,2-(4,4'-dihydroxydiphenyl)-butane, 3,3-(4,4'-dihydroxydiphenyl)-pentane,α,α'-(4,4'-dihydroxydiphenyl)-p-diisopropylbenzene, 1,3-cyclohexane diol, 1,4-cyclohexane diol, 1,4-cyclohexanedimethanol, bicyclic and tricyclic diols such as 4,8-bis-(hydroxymethyl)-tricyclo [5.2.1.0$^{2,6}$] decane, 2,2,4,4-tetramethyl-1,3-cyclobutanediol, hydroquinone, resorcinol, 2,2-(4,4'-dihydroxyphenyl)-sulfone, and 4,4'-oxydiphenol, among others, as well as halogenated derivatives of the above, such as tetrabrominated ethoxylated bisphenol-A. These ring compounds may also be substituted with either reactive groups or unreactive groups such as alkyl groups containing about 1 to 4 carbon atoms. This reaction may be carried out at temperatures from room temperature to about 180° C, preferably about 40°–120° C, depending upon the specific reactants selected. At the lower temperatures, use of standard catalysts may be desirable. Unreactive diluents may be used, if desired.

The polyisocyanate thus formed is reacted with a polymeric, grafted alkylene ether compound having at each end of the chain a functional group containing a reactive hydrogen atom, preferably in a hydroxyl group.

The graft polymer segments of the prepolymers of this invention are derived from poly(alkylene)ether polyol backbones to which have been grafted vinyl monomers or polymers. The graft polymers conform to the structural formula:

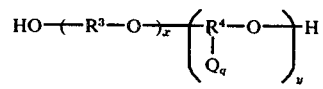

wherein $R^3$ and $R^4$ are alkenyl and/or branched alkenyl radicals having 2 to about 10, preferably 3 to about 6, carbon atoms; Q is a vinyl polymeric or copolymeric radical which may be linear or branched alkyl, alkenyl, alkynyl, aromatic, cycloaliphatic or heterocyclic, containing 2 to about 12, preferably 4 to about 10, carbon/hetero atoms, x may range from 0 to about 200, preferably from about 10 to about 100; y may range from 1 to about 100, preferably from 1 to about 50; and q may range from 1 to about 400, preferably from 1 to about 200. The preferred vinyl radicals, i.e., Q, are derived from acrylonitrile, styrene, methyl methacrylate, vinyl acetate, ethyl acrylate, vinyl chloride and vinylidene chloride, of which acrylonitrile and styrene are especially preferred. The preferred alkylene ether radicals are derived from 1,2-propylene oxide, ethylene oxide and tetramethylene oxide. It will be understood that the term "vinyl" includes pendent unsaturation (e.g., $CH_2 = CH-$), polyvinyl derivatives (e.g., $CH_3(CH_2)_q$), and copolymeric vinyl derivatives (e.g., copolymers of acrylonitrile and butadiene). The above graft polymer segments and their preparation have been described by Kuryla et al. in *Journal of Cellular Plastics*, "Polymer/Polyols, a New Class of Polyurethane Intermediates," March, 1966, the disclosure of which is incorporated herein by reference, as well as by Frisch et al., "Advances in Urethane Science and Technology," Vol. 2, page 9 et seg., Technomic Publishing Co., Inc., Westport, Conn. (1971). The graft polymer segments are typically prepared by the in situ polymerization of a vinyl monomer in a liquid polyol solution to produce a fine, usually quite stable, dispersion, of the polymeric portion in the polyol. The resulting so-called "polymer/polyols" are commercially available in the dispersion form from Union Carbide Corp., New York, N.Y. (under the trademark "Niax" polyol), and from BASF-Wyandotte Corp., Wyandotte, Mich. (under the trademark "Pluracol").

In general terms, the procedure for preparation of the polymer/polyol dispersion involves gradually adding one part vinyl monomer to a stirred mixture of 4 parts polyol and about 0.05 part peroxy initiator (e.g., benzoyl peroxide) at a temperature of 80° C or more. Unreacted monomer may subsequently be removed by vacuum stripping. Of course, this illustration is not meant to be limiting; appropriate quantities and reaction conditions will vary with the specific materials involved and are within the skill of the art to determine.

It will be observed from the above that the polymer/polyols of this invention comprise a mixture of two reactive species, namely, the grafted polyol and the ungrafted polyol, as well as any ungrafted residual vinyl compound (e.g., poly(acrylonitrile)). While the grafted species can be separated from the dispersion, by well-known solvent techniques, as a solid material, it is not necessary for purposes of the present invention to do so. In fact, the polymer/polyol dispersion mixture is the preferred reactant since it tends to provide subsequent prepolymer which is both "filled" (via the solid grafted resin) and "plasticized" (via the polyol). It it were desired to separate the grafted polyol, it could, of course, be redispersed in an appropriate solvent (preferably an inert solvent) for subsequent reaction to form the prepolymers of this invention. Thus, it will be understood that the spirit and scope of this invention include use of both the polymer/polyol natural dispersion and a separately prepared dispersion or solution of the grafted polyol species itself.

The viscosity of the polymer/polyol dispersions useful in this invention covers a broad range, typically from about 500 to about 10,000 cps (measured at 25° using RVT Brookfield viscometer). While viscosity is not considered to be a critical parameter in subsequent preparation of the prepolymer, the lower viscosities are preferred (i.e., about 500 to about 4,000 cps, measured as above), since they tend to result in prepolymers having correspondingly low viscosities, which is a definite advantage in certain applications of the prepolymer (e.g., as an adhesive in retaining a bearing on a shaft).

In a preferred embodiment, the flexible grafted (alkylene)ether polyol having functional groups containing an active hydrogen is reacted with the polyisocyanate in such proportion that the polyisocyanate is present in molar excess as to the concentration of the active hydrogen-containing groups. In this way a product is assured which has an —NCO group at each end of the poly(alkylene)ether segment. The molar excess of polyisocyanate may vary from about 0.05 to about 6.

This reaction may be carried out at temperatures from about room temperature to about 150° C, preferably from about 40° C to about 120° C. After addition of the flexible diol, about 0.1 to 30 hours are required for completion at the preferred temperature range. The reaction may also be catalyzed, if desired, and unreactive diluents may be used for viscosity control.

The product of the above reaction is reacted with a molar equivalence, preferably a molar excess, based on —NCO group content, of an acrylate or methacrylate ester containing a hydroxy or amine group on the nonacrylate portion thereof. This results in an adhesive/sealant monomer, or more accurately, prepolymer, capped at both ends with acrylate or methacrylate functionality. Esters suitable for use in this invention correspond to the formula

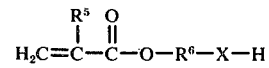

wherein X is as previously defined, $R^5$ is selected from the class consisting of hydrogen, chlorine and methyl and ethyl radicals; and $R^6$ is a divalent organic radical selected from the group consisting of lower alkylene of 1–8 carbon atoms, phenylene and naphthylene.

The suitable hydroxy- or amine-containing materials are exemplified by, but not limited to, such materials as hydroxyethyl acrylate, hydroxyethyl methacrylate, aminoethyl methacrylate, 3-hydroxypropyl methacrylate, aminopropyl methacrylate, hydroxyhexyl acrylate, t-butylaminoethyl methacrylate, hydroxyoctyl methacrylate, and the monoacrylate or monomethacrylate esters of bisphenol-A, the fully hydrogenated derivative of bisphenol-A, cyclohexyl diol, and the like.

The reaction may be accomplished in the presence or absence of diluents. Preferably, diluents which include the hydrocarbons, such as aliphatic, cycloaliphatic and aromatic hydrocarbons, for example, benzene, toluene, cyclohexane, hexane, heptane, and the like, are employed, but other diluents, such as methyl isobutyl ketone, diamyl ketone, isobutyl methacrylate, and cyclohexyl methacrylate can also be beneficially utilized, if desired, especially where complete compatability with the sealant system is desired.

The temperature employed in the reaction may also vary over a wide range. Where the components are combined in approximately chemical equivalent amounts, useful temperatures may vary from room temperature or below, e.g., 10° C to 15° C, up to and including temperatures of 100° C to 180° C. Where reacting the simpler isocyanate adducts, the components are preferably combined at or near room temperature, such as temperatures ranging from 20° C to 30° C. At the lower reaction temperatures, use of a catalyst is preferred. When reacting the higher molecular weight isocyanate adducts, higher temperatures are preferred, e.g., about 40° C to about 150° C.

It will be recognized that the acrylate-terminated adducts of this invention can be prepared by processes other than that described above. Thus, for instance, the polyisocyanate compound can be reacted with a suitable hydroxyacrylate and this adduct reacted with a suitable grafted alkylene ether polymer having the necessary reactive hydrogen.

The fully-prepared monomeric prepolymers of this invention correspond to the formula

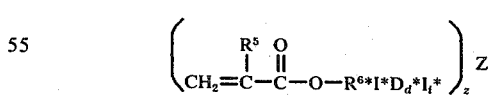

wherein $R^5$ and $R^6$ are as previously defined; I is a polyisocyanate radical; D is an aromatic, heterocyclic or cycloaliphatic polyol or polyamine radical, preferably a diol, and more preferably a diol of a cycloaliphatic compound; Z is a polymeric or copolymeric grafted alkylene ether polyol or alkylene ether polyol radical, as already described; z is an integer corresponding to the valency of Z; d is either 1 or 0; and i is 0 when d is 0, and otherwise is equal to one less than the number of reactive hydrogen atoms of D. As used herein, an asterisk(*) indicates a urethane (—NH—COO—) or ureide (—NH—CO—NH—) bond.

The prepolymer described above cures to a hard, tough resin via a free-radical mechanism using any of a wide variety of known peroxy initiators. Illustrative of such initiators are the diacyl peroxides such as benzoyl peroxide; dialkyl peroxides such as di-tert.-butyl peroxide; ketone peroxides such as methylethyl ketone peroxide; and peresters which readily hydrolyze, e.g., tert.-butyl peracetate, tert.-butyl perbenzoate, di-tert.-butyl diperphthalate, etc. A particularly useful class of peroxy initiators are the organic hydroperoxides such as cumene hydroperoxide, methylethyl ketone hydroperoxide, tert.-butyl hydroperoxide, etc. Of these, cumene hydroperoxide is especially preferred. The initiators should be used at a concentration of about 0.01 percent to about 10 percent by weight of the total formulation, preferably about 0.1 percent to about 5 percent by weight. Another useful class of initiators comprises carbonyl-containing ultraviolet-activated free-radical generators, such as acetophenone, benzophenone, and the benzoin ethers. Suitable UV initiators are disclosed in co-pending application Ser. No. 356,679, filed May 2, 1973. Initiator mixtures may also be used.

It will also be understood that the curable composition of this invention can also be formulated as a two-part composition. In such a case, the initiator or one of a combination of initiators can comprise a second part which is combined with the first, monomeric, part at the point of use. Thus, the monomer can be applied to one surface to be joined, the initiator can be applied to a second surface, and the two surfaces then joined. Similarly, an accelerator, such as mentioned below, can be applied separately as a second part to one of the surfaces to be joined, e.g., as a "primer."

It may be desirable to accelerate the cure polymerization by application of moderate amounts of heat, e.g., 50° C to 150° C. At temperatures above about 125° C, cure will typically be complete within about 10 minutes or less.

The prepolymers of this invention can be formulated into room temperature-curing anaerobic adhesives and sealants. Formulations of this type are well described in the art, e.g., U.S. Pat. No. 3,043,820 to Krieble, among others, utilizing the hydroperoxide class of initiators. Such anaerobic formulations may also advantageously include polymerization accelerators such as organic imides (e.g., benzoic sulfimide) and primary, secondary or tertiary amines, and inhibitors or stabilizers of the quinone or hydroquinone families. The accelerators are generally employed in concentrations of less than 10 percent by weight, and the inhibitors in concentrations of about 10 to 1,000 parts per million. When prepared as anaerobic formulations, the compositions of this invention have the advantage of long-term stability and the ability to cure at room temperature upon exclusion of oxygen, as between the mating threads of a nut and bolt or the juxtaposed surfaces of a bearing and shaft. The anaerobic cure speed can be enhanced by application of moderate heat, e.g., up to about 150° C.

The adhesive and sealant formulations of this invention may be prepared, if desired, with reactive diluents which are capable of copolymerizing with the instant prepolymers. Typical of such diluents are the hydroxyalkyl acrylates such as hydroxyethyl acrylate, hydroxypropyl acrylate, and the corresponding methacrylate compounds, including cyclohexyl methacrylate, and tetrahydrofurfuryl methacrylate. Other unsaturated reactive diluents, such as styrene and acrylonitrile, can also be used. When used, the concentration of such diluents should be less than about 60 percent by weight, and preferably about 40 to about 10 percent.

One of the significant advantages of the prepolymers of this invention is their ability to cure through large gaps, e.g., up to about 55 mils. This behavior may be enhanced by application of moderate heat. Preferably, however, it is enhanced by use of any of the primers known for anaerobic systems, such as those disclosed in U.S. Pat. No. 3,625,930 to Toback, et al., and particularly those of the thiourea type disclosed in copending application Ser. No. 323,689, filed Jan. 15, 1973. Such primers are advantageously applied as a spray from dilute solvent solution to either or both surfaces to be joined.

The following examples provide specific illustrations of various aspects of the present invention and are in no way limitations on it.

EXAMPLE 1

A nitrogen-swept, 4-necked resin kettle equipped with a stainless steel stirrer, nitrogen inlet tube, thermometer, condenser, and entrance port, was heated to approximately 60° C and charged with the following: 25.0 grams of methylene-bis-phenylisocyanate (MDI) and a solution of 35.0 grams of triethyleneglycol dimethyacrylate (TRIEGMA) and 200 ppm of a quinone stabilizer. A degassed polypropyleneoxide polyol containing polystryene and polyacrylonitrile branches grafted onto the polyol backbone ("Pluracol" 581, OH No. = 26.5, BASF-Wyandotte, Wyandotte, Mich. was added slowly (212 grams within 2½ hours). After completion of the polyol addition, heating was continued (60°–68° C pot temperature) for one-half hour and a small sample was then removed for NCO analysis. A standard dibutylamine titration procedure yielded a titer of 1.56% NCO. The theoretical NCO content of the desired prepolymer was 1.53%.

A diluent solution of 40.5 grams TRIEGMA and 200 ppm of a quinone stabilizer was added to maintain a thin, fluid, reaction medium. The NCO-capped prepolymer, above, was reacted with 33.1 grams of 96% hydroxypropyl methacrylate at 55°–70° C to yield a methacrylate-urethane-capped prepolymer. The resultant solution contained approximately 72% concentration of urethane dimethacrylate structures corresponding to the general formula (HPMA*MDI)$_2$*[Graft PS-PAN/PPO] wherein "Graft PS-PAN/PPO" refers to polystyrene-polyacrylonitrile branches grafted onto a polypropyleneoxide polyol backbone.

EXAMPLE 2

To a nitrogen-swept resin kettle, equipped as described in Example 1, was charged 34.8 grams of toluene diisocyanate (TDI) (80% 2,4-/20% 2,6-). The TDI was heated to 95°–100° C. Hydrogenated bisphenol-A (HBPA), 18.0 grams, was added in a slow, step-wise fashion within 1¼ hours. Fifteen minutes after the HBPA additions were completed, a solution of 51.4 grams TRIEGMA and 300 ppm of a quinone stabilizer was added slowly. Fifteen minutes later, addition of 6.0 grams of HBPA in 3-5 portions was performed. Upon completion of a 15–30 minute reaction period, the bath temperature was lowered such that the reaction temperature was at 60°–65° C. The reaction mixture consisted of a toluene diisocyanate-capped HBPA prepolymer (abbreviated TDI*HBPA*TDI) dissolved in TRIEGMA.

To the reaction was added 129.1 grams of a degassed "Pluracol" 581 polyol over a 2-hour period. Heating and stirring were continued while a diluent solution of 34.3 grams of TRIEGMA and 200 ppm of a quinone stabilizer was added. A small sample was removed and examined for NCO content. The theoretical NCO content was 2.22% whereas the found titer was 2.67% NCO. Hydroxypropyl-methacrylate (96%), 34.8 grams, was added and the reaction solution was heated for an additional hour at 65°–70° C. The resultant solution contained approximately 70% concentration of urethane dimethyacrylate structures corresponding to the general formula (HPMA*TDI*HBPA*TDI)$_2$*[-Graft PS-PAN/PPO].

EXAMPLE 3

To a nitrogen-swept resin kettle, equippedd as described in Example 1, was charged 25.0 grams of MDI. The MDI was heated to approximately 55° C. A polyol containing grafted polystyrene and polyacrylonitrile branches ("Pluracol" 581), 212 grams, was added slowly over a 2½ hour period. Heating was maintained for another hour and a sample was removed for NCO analysis. Titration yielded a titer of 3.58% NCO vs the theoretical level of 3.55% NCO. To the MDI-capped prepolymer was added 43.8 grams of 96% hydroxypropyl methacrylate and 150 ppm of a quinone stabilizer. Heating at 65°–70° C was continued for another hour. Upon cooling, a white, viscous resin was obtained with a Brookfield viscosity of 200,000 cps at 25° C. The resultant liquid contained approximately 95% concentration of urethane dimethacrylate structures corresponding to the general formula (HPMA*MDI)$_2$*[-Graft PS-PAN/PPO].

EXAMPLE 4

Example 1 was repeated, except that a polypropyleneoxide polyol containing grafted polyacrylonitrile branches ("Niax" Polyol 31-28, OH No. = 29.2, Union Carbide Corp., New York, N.Y.) was substituted. The corresponding prepolymer was obtained.

EXAMPLE 5

Example 2 was repeated, except that the "Niax" Polyol 31-28 polyol was substituted. The corresponding prepolymer was obtained.

EXAMPLE 6

This example illustrates a typical anaerobic adhesive formulation utilizing any of the prepolymers, or mixtures thereof, described above. With good stirring, add 4.6 grams of hydroxypropyl methacrylate to 79 grams of the prepolymer resin product solution (70–75 percent solids). A slurry of 0.38 gram saccharine in 3.8 grams of triethyleneglycol dimethacrylate is then stirred in. Subsequently, 5.6 grams of acrylic acid (adhesion enhancer) and 2.8 grams of cumene hydroperoxide (CHP) are added and stirring is continued for about 1 hour. Minor amounts of stabilizers, accelerators, thickeners, plasticizers, and the like, may be added, as desired, as is known in the art.

EXAMPLE 7

Anaerobic adhesive formulations were prepared similar to Example 6 using the following prepolymers:

TABLE I

| Prepolymer | General Structure |
|---|---|
| A | (HPMA*MDI)$_2$*[Graft PS-PAN/PPO] |
| B | (HPMA*TDI*HBPA*TDI)$_2$*[Graft PS-PAN/PPO] |
| C | (HPMA*MDI)$_2$*[Graft PAN/PPO] |
| D | (HPMA*TDI*HBPA*TDI)$_2$*[Graft PAN/PPO] |

The typical strength properties for these adhesive formulations are reported in Table II, below. Tensile strength measurements were performed according to ASTM D-2095-72. Simply described, this test involves adhering together two steel rods by butt joining their respective ends. The opposite rod ends are then pulled with a measuring device such as an Instron Tester, and the tensile strength of the bond is measured. The tensile lap shear test was performed according to ASTM D-1002-65. This test involves adhering together overlapping surfaces of two test strips. When steel lap strips are used, the surfaces are sand blasted; when aluminum strips are used, the surfaces are etched with chromic acid. The ends of the so-assembled specimens are pulled with a measuring device such as an Instron Tester, and the tensile shear strength of the bond is measured. Compressive shear, tested according to military specification MIL-R-46082A(MR), measures the ability of an adhesive to retain a sleeve or bearing on a shaft. The test involves adhering a cylindrical "pin" within the bore of a mating collar. The force required to press the pin from the collar is then measured on an Instron Tester or equivalent. Impact strength was tested according to ASTM D-950-72. This test involves a steel block mated to another steel block with adhesive and then struck by a swinging pendulum device, such as a Baldwin Impact Tester. The impact force required to separate the blocks is measured. Heat (200° F, 1 hour) was used, for convenience, to accelerate cure in all tests.

TABLE II

| Prepolymer-Adhesive Formulation | Tensile psi | Tensile Lap Shear, psi | |
|---|---|---|---|
| | | Steel | Aluminum |
| A | 3300 | 2100 | 2390 |
| B | 5715 | 3315 | 3275 |
| C | 5135 | 2160 | 2065 |
| D | 5970 | 3140 | 3415 |

EXAMPLE 8

As the above formulations can be of very low viscosity (less than 1000 cps, if desired), which is advantageous in certain retaining-bonding applicatons, A and B formulations were tested for compressive shear strength.

TABLE III

| Prepolymer | Compressive Shear, psi | |
|---|---|---|
| | Room Temperature | 400° F |
| A | 1675 | 230 |
| B | 3830 | 215 |

EXAMPLE 9

Another distinct advantage of the present prepolymers is their ability to cure through gaps, e.g., 10 mils or more. Table IV presents tensile shear data and impact strengths for prepolymers B and D. Except for the instances noted in the table, cure was achieved at room temperature. Surfaces used for room temperature testing were primed with a tetramethyl thiourea activator known to the art. Cure time at 20 mils was 24 hours.

TABLE IV

| Prepolymer-Adhesive Formulation | Tensile Lap Shear, psi | | Impact Strength, ft. lbs./sq. in. | |
|---|---|---|---|---|
| | 20-mil gap Steel laps | gap Aluminum laps | 0-mil gap heat cure* | 20-mil gap |
| B | 1825 | 1765 | 12.7 | 10.9 |
| D | 1950 | 2215 | 13.2 | 11.1 |

*200° F, 90 minutes

EXAMPLE 10

An adhesive formulation was prepared using prepolymer A (Table I) according to the procedure of Example 6, except that 5 percent (based on total formulation weight) of benzoyl peroxide was substituted for the CHP and saccharine. A 2–5 mil thick film of the formulation was spread on a steel strip which was placed in a 200° F oven for 1½ hours, then cooled to room temperature. The formulation cured to a dry, soft film.

A tensile lap shear test (with steel) was performed with this formulation according to the ASTM procedure mentioned in Example 7. Heat cure was applied (200° F, 1½ hours) resulting in a bond strength of 2545 psi.

EXAMPLE 11

A curable formulation was prepared using prepolymer A (Table I) similar to the procedure of Example 6, except that 5% (based on total formulation weight) of benzophenone was substituted for the CHP and saccharine. A 2–5 mil thick film of the formulation was spread on a piece of glass and exposed to ultraviolet radiation. The UV source was a 400-watt mercury vapor bulb housed in a "Porta-Cure 400" lamp, both bulb and lamp manufactured by American Ultraviolet Co. The UV source was adjusted to provide 6000 microwatts of radiation intensity at the film. After 4 minutes of exposure, the formulation had cured to a tacky film and after 10 minutes of exposure, the formulation had cured to a hard, dry film.

The same formulation was used to assemble a lap shear test specimen, except that glass strips were used in place of steel. The specimen was exposed to UV radiation of 6,000 microwatts at the bond line. In about 30 seconds, the glass strips had become fixtured (could not be moved by hand relative to each other).

What is claimed is:

1. A curable adhesive and sealant composition comprising:
   I. a polymerizable product corresponding in structure to a reaction product of:
      a. a poly(alkylene)ether polyol to which a vinyl radical has been grafted, with either of:
      b. (i) a molar excess of a reaction product of: a molar excess of an aromatic or cycloaliphatic polyisocyanate with a compound selected from the group consisting of an aromatic or cycloaliphatic polyol or polyamine, or (ii) a molar excess of an aromatic or cycloaliphatic polyisocyanate, the product of (a) and (b)(i) or (a) and (b)(ii) subsequently being reacted with at least a molar equivalence of a hydroxyalkyl acrylate, a hydroxyalkyl methacrylate, an aminoalkyl acrylate, or an aminoalkyl methacrylate; and
   II. a free radical initiator.

2. A composition of claim 1 wherein the polyol is poly(oxypropyl)diol or triol.

3. A composition of claim 2 wherein the vinyl radical is derived from acrylonitrile, styrene, or their copolymers.

4. A composition of claim 1 wherein the polyisocyanate is toluene diisocyanate.

5. A composition of claim 1 wherein the polyisocyanate is 4,4'-diisocyanato diphenylmethane.

6. A composition of claim 1 wherein reaction product (b)(i) is an NCO-terminated product of hydrogenated bisphenol-A and toluene diisocyanate.

7. A composition of claim 1 wherein the hydroxyalkyl methacrylate is hydroxyethyl methacrylate.

8. A composition of claim 1 wherein the hydroxyalkyl methacrylate is hydroxypropyl methacrylate.

9. A composition of claim 1 which additionally contains an organic solvent.

10. A composition of claim 9 wherein the solvent is a co-reactive solvent.

11. A composition of claim 1 wherein the initiator is a peroxy initiator.

12. A composition of claim 1 wherein the initiator is an ultraviolet-activated initiator.

13. An anaerobic adhesive and sealant composition comprising:
   I. a polymerizable product corresponding in structure to a reaction product of:
      a. a poly(alkylene)ether polyol to which a vinyl radical has been grafted, with either of:
      b. (i) a molar excess of a reaction product of: a molar excess of an aromatic or cycloaliphatic polyisocyanate with a compound selected from the group consisting of an aromatic or cycloaliphatic polyol or polyamine, or (ii) a molar excess of an aromatic or cycloaliphatic polyisocyanate, the product of (a) and (b)(i) or (a) and (b)(ii) subsequently being reacted with at least a molar equivalence of a hydroxyalkyl acrylate, a hydroxyalkyl methacrylate, an aminoalkyl acrylate, or an aminoalkyl methacrylate; and
   II. a peroxy initiator.

14. A composition of claim 13 wherein the peroxy initiator is a hydroperoxide.

15. A composition of claim 14 wherein the hydroperoxide is cumene hydroperoxide.

16. A composition of claim 13 wherein the polyol is poly(oxypropyl)diol or triol.

17. A composition of claim 16 wherein the vinyl radical is derived from acrylonitrile, styrene, or their copolymers.

18. A composition of claim 13 wherein the polyisocyanate is toluene diisocyanate.

19. A composition of claim 13 wherein the polyisocyanate is 4,4'-diisocyanato diphenylmethane.

20. A composition of claim 13 wherein reaction product (b)(i) is an NCO-terminated product of hydrogenated bisphenol-A and toluene diisocyanate.

21. A composition of claim 13 wherein the hydroxyalkyl methacrylate is hydroxyethyl methacrylate.

22. A composition of claim 13 wherein the hydroxylalkyl methacrylate is hydroxypropyl methacrylate.

23. A composition of claim 13 which additionally contains an organic solvent.

24. A composition of claim 23 wherein the solvent is a co-reactive solvent.

25. A composition of claim 13 which additionally contains a polymerization accelerator.

26. A composition of claim 25 wherein the accelerator is an imide or amine.

27. A curable adhesive and sealant composition comprising:
I. a polymerizable product corresponding in structure to a reaction product of:
   a. a poly(alkylene)ether polyol in which is dispersed a reaction product derived by grafting a vinyl radical onto said polyol, with either of:
   b. (i) a molar excess of a reaction product of: a molar excess of an aromatic or cycloaliphatic polyisocyanate with a compound selected from the group consisting of an aromatic or cycloaliphatic polyol or polyamine, or (ii) a molar excess of an aromatic or cycloaliphatic polyisocyanate, the product of (a) and (b)(i) or (a) and (b)(ii) subsequently being reacted with at least a molar equivalence of a hydroxyalkyl acrylate, a hydroxyalkyl methacrylate, an aminoalkyl acrylate, or an aminoalkyl methacrylate; and
II. a free radical initiator.

28. A composition of claim 27 wherein the polyol is poly(oxypropyl)diol or triol.

29. A composition of claim 27 wherein the vinyl radical is derived from acrylonitrile, styrene, or their copolymers.

30. A composition of claim 27 wherein the polyisocyanate is toluene diisocyanate.

31. A composition of claim 27 wherein the polyisocyanate is 4,4'-diisocyanato diphenylmethane.

32. A composition of claim 27 wherein reaction product (b)(i) is an NCO-terminated product of hydrogenated bisphenol-A and toluene diisocyanate.

33. A composition of claim 27 wherein the hydroxyalkyl methacrylate is hydroxyethyl methacrylate.

34. A composition of claim 27 wherein the hydroxyalkyl methacrylate is hydroxypropyl methacrylate.

35. A composition of claim 27 which additionally contains an organic solvent.

36. A composition of claim 35 wherein the solvent is a co-reactive solvent.

37. A composition of claim 27 wherein the initiator is a peroxy initiator.

38. A composition of claim 27 wherein the initiator is an ultraviolet-activated initiator.

39. An anaerobic adhesive and sealant composition comprising:
I. a polymerizable product corresponding in structure to a reaction product of:
   a. a poly(alkylene)ether polyol in which is dispersed a reaction product derived by grafting a vinyl radical onto said polyol, with either of:
   b. (i) a molar excess of a reaction product of: a molar excess of an aromatic or cycloaliphatic polyisocyanate with a compound selected from the group consisting of an aromatic or cycloaliphatic polyol or polyamine, or (ii) a molar excess of an aromatic or cycloaliphatic polyisocyanate, the product of (a) and (b)(i) or (a) and (b)(ii) subsequently being reacted with at least a molar equivalence of a hydroxyalkyl acrylate, a hydroxyalkyl methacrylate, an aminoalkyl acrylate, or an aminoalkyl methacrylate; and
II. a peroxy initiator.

40. A composition of claim 39 wherein the peroxy initiator is a hydroperoxide.

41. A composition of claim 40 wherein the hydroperoxide is cumene hydroperoxide.

42. A composition of claim 39 wherein the polyol is poly(oxypropyl)diol or triol.

43. A composition of claim 42 wherein the vinyl radical is derived from acrylonitrile, styrene, or their copolymers.

44. A composition of claim 39 wherein the polyisocyanate is toluene diisocyanate.

45. A composition of claim 39 wherein the polyisocyanate is 4,4'-diisocyanato diphenylmethane.

46. A composition of claim 39 wherein reaction product (b)(i) is an NCO-terminated product of hydrogenated bisphenol-A and toluene diisocyanate.

47. A composition of claim 39 wherein the hydroxyalkyl methacrylate is hydroxyethyl methacrylate.

48. A composition of claim 39 wherein the hydroxyalkyl methacrylate is hydroxypropyl methacrylate.

49. A composition of claim 39 which additionally contains an organic solvent.

50. A composition of claim 49 wherein the solvent is a co-reactive solvent.

51. A composition of claim 39 which additionally contains a polymerization accelerator.

52. A composition of claim 51 wherein the accelerator is an imide or amine.

53. A process for preparing an adhesive and sealant monomer comprising:
I. reacting:
   a. a poly(alkylene)ether polyol to which a vinyl radical has been grafted, with either of:
   b. (i) a molar excess of a reaction product of: a molar excess of an aromatic or cycloaliphatic polyisocyanate with a compound selected from the group consisting of an aromatic or cycloaliphatic polyol or polyamine, or (ii) a molar excess of an aromatic or cycloaliphatic polyisocyanate,
II. the product of (a) and (b)(i) or (a) and (b)(ii) subsequently being reacted with at least a molar equivalence of a hydroxyalkyl acrylate, a hydroxyalkyl methacrylate, an aminoalkyl acrylate, or an amino-alkyl methacrylate.

54. A process for preparing an adhesive and sealant monomer comprising reacting:
I. a polymerizable product corresponding in structure to a reaction product of:
   a. a poly(alkylene)ether polyol in which is dispersed a reaction product derived by grafting a vinyl radical onto said polyol, with either of:
   b. (i) a molar excess of a reaction product of: a molar excess of an aromatic or cycloaliphatic polyisocyanate with a compound selected from the group consisting of an aromatic or cycloaliphatic polyol or polyamine, or (ii) a molar excess of an aromatic or cycloaliphatic polyisocyanate,
II. the product of (a) and (b)(i) (i) or (a) and (b)(ii) subsequently being reacted with at least a molar equivalence of a hydroxyalkyl acrylate, a hydroxyalkyl methacrylate, an aminoalkyl acrylate, or an aminoalkyl methacrylate.

55. A process for sealing or adhering surfaces which comprises:
A. applying to at least one of said surfaces an adhesive and sealant composition comprising:
I. a polymerizable product corresponding in structure to a reaction product of:

a. a poly(alkylene)ether polyol to which a vinyl radical has been grafted, with either of:

b. (i) a molar excess of a reaction product of: a molar excess of an aromatic or cylcoaliphatic polyisocyanate with a compound selected from the group consisting of an aromatic or cycloaliphatic polyol or polyamine, or (ii) a molar excess of an aromatic or cycloaliphatic polyisocyanate, the product of (a) and (b)(i) or (a) and (b)(ii) subsequently being reacted with at least a molar equivalent of a hydroxyalkyl acrylate, a hydroxyalkyl methacrylate, an aminoalkyl acrylate, or an aminoalkyl methacrylate; and II. a free radical initiator; and B. placing said surfaces in an abutting relationship until the composition has cured.

56. A process for sealing or adhering surfaces which comprises:

A. applying to at least one of said surfaces an adhesive and sealant composition comprising:

I. a polymerizable product corresponding in structure of a reaction product of:

a. a poly(alkylene)ether polyol in which is dispersed a reaction product derived by grafting a vinyl radical onto said polyol, with either of:

b. (i) a molar excess of a reaction product of: a molar excess of an aromatic or cycloaliphatic polyisocyanate with a compound selected from the group consisting of an aromatic or cycloaliphatic polyol or polyamine, or (ii) a molar excess of an aromatic or cycloaliphatic polyisocyanate, the product of (a) and (b)(i) or (a) and (b)(ii) subsequently being reacted with at least a molar equivalence of a hydroxyalkyl acrylate, a hydroxyalkyl methacrylate, an aminoalkyl acrylate, or an aminoalkyl methacrylate; and II. a free radical initiator; and B. placing said surfaces in an abutting relationship until the composition has cured.

* * * * *

UNITED STATES PATENT OFFICE
CERTIFICATE OF CORRECTION

Patent No. 4,018,851                    Dated   April 19, 1977

Inventor(s)   Louis J. Baccei

It is certified that error appears in the above-identified patent and that said Letters Patent are hereby corrected as shown below:

Column 2, line 54 to line 55: delete the term "(4,4'-diisocyanate diphenyl-methane)" and substitute -- (4,4'-diisocyanato diphenyl-methane) --.

Column 3, line 68: delete the term "2,2 (4,4'-dihydroxyphenyl)-" and substitute -- 2,2-(4,4'-dihydroxydiphenyl)- --.

Signed and Sealed this

Twenty-first Day of March 1978

[SEAL]

Attest:

RUTH C. MASON
Attesting Officer

LUTRELLE F. PARKER
Acting Commissioner of Patents and Trademarks